United States Patent [19]

Morgan et al.

[11] Patent Number: 4,509,325
[45] Date of Patent: Apr. 9, 1985

[54] TURBINE ENGINE COLD TEMPERATURE STARTING SYSTEM

[75] Inventors: Walter R. Morgan, Simi Valley, Calif.; Edmund A. Boniface, Ogden, Utah; Clayton A. Huben, West Bloomfield, Mich.

[73] Assignee: The United States of America as represented by the Secretary of the Navy, Washington, D.C.

[21] Appl. No.: 974,155

[22] Filed: Dec. 28, 1978

[51] Int. Cl.³ .................................................. F02C 7/26
[52] U.S. Cl. .................... 60/39.141; 60/39.142
[58] Field of Search ................. 60/39.14 R, 39.14 M; 91/5; 92/130 R, 130 B

[56] References Cited

U.S. PATENT DOCUMENTS

| 2,793,619 | 5/1957 | Tirro | 92/130 R |
|---|---|---|---|
| 2,798,360 | 7/1957 | Hazen et al. | 60/39.14 R |
| 2,808,702 | 10/1957 | Dotson | 60/39.14 R |
| 2,818,704 | 1/1958 | Karcher | 60/39.14 |
| 2,848,873 | 9/1958 | Levetus et al. | 91/5 |
| 2,941,790 | 6/1960 | Compton | 263/19 |
| 2,988,058 | 6/1961 | Warnecke | 92/130 R |
| 2,989,848 | 6/1961 | Paiement | 60/39.14 |
| 3,026,849 | 3/1962 | Powers et al. | 91/5 |
| 3,126,174 | 3/1964 | Zetterstrom | 244/53 |
| 3,156,229 | 11/1964 | Manning | 60/39.14 M |
| 3,170,450 | 2/1965 | Kent et al. | 60/39.14 M |
| 3,439,495 | 4/1969 | Binsley | 60/39.02 |
| 3,446,223 | 5/1969 | Hancock | 137/15.2 |
| 3,533,238 | 10/1970 | Marvin | 60/233 |
| 3,552,873 | 1/1971 | Ghougasian | 60/39.14 R |
| 3,631,675 | 1/1972 | Keiter | 60/39.65 |
| 3,662,556 | 5/1972 | Poucher | 60/226 R |

Primary Examiner—Louis J. Casaregola
Attorney, Agent, or Firm—Robert F. Beers; Arthur A. McGill; Prithvi C. Lall

[57] ABSTRACT

A valving device is provided in the inlet of a turbine engine to facilitate starting in cold temperatures. The device or damper is positioned in the main compressor intake, is spring loaded in the open position, and is closed by hydraulic pressure during engine ignition. An increased fuel/air mixture and reduced velocity through the combustor result which enable starting of the engine at very cold temperatures.

1 Claim, 1 Drawing Figure

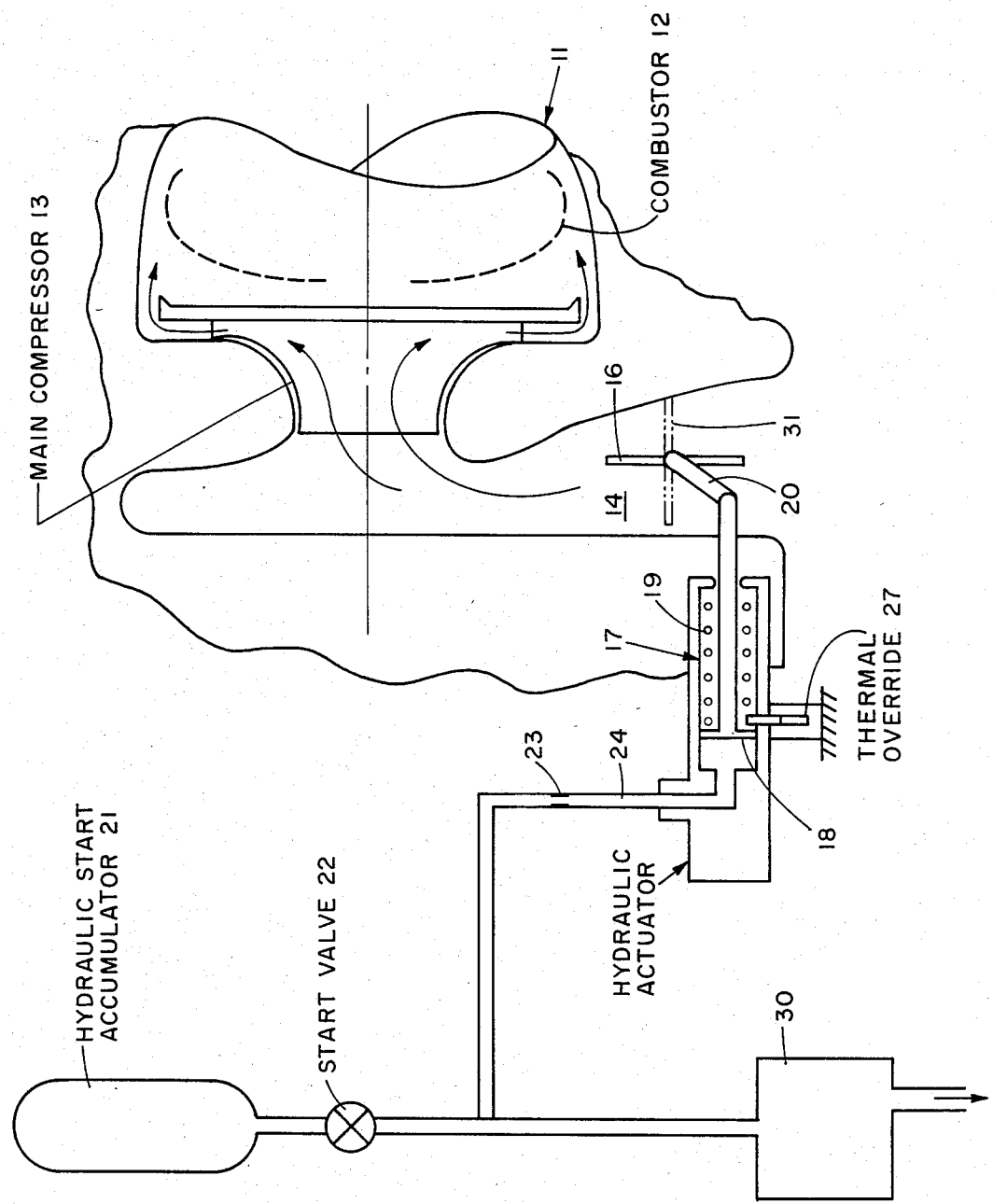

TURBINE ENGINE COLD TEMPERATURE STARTING SYSTEM

This invention concerns turbine engines and, more particularly, means for enabling the starting of gas turbine engines at very cold temperatures.

Increasing the forward speed and/or the altitude of gas turbine engines makes starting them even more difficult than starting at cold temperatures. Prior starting systems are deficient in that they require either redesign of the combustion chamber, oxygen injection, primer injection or continuous usage of a more volatile fuel, or heating from an external source, among other methods and means. A more suitable starting system should be reliable and, therefore, simple in construction and operation, and not dependent upon the electrical controls in the aircraft. One restarting method mentioned above involves the practice of oxygen injection at high altitudes/cold temperatures; however, this is undesirable since it requires the storage and maintenance of a dangerous combustible and is normally limited to one start. The primer injection method of restarting requires a more volatile fuel and the maintenance of a separate fuel system which increases chances for human error and provides an additional fire potential. The method requiring heating from an external source involves additional equipment. The present invention avoids the deficiencies of prior systems and provides a method and means which can be applied to any gas turbine engine to enhance its low temperature/high speed/high altitude starting capability without impacting the normal starting ability of the unit or its normal operation.

Accordingly, it is an object of the present invention to provide a starting system for turbine engines which does not require additional systems to be installed in the aircraft.

Another object of this invention is to provide a starting system for turbine engines which does not require abnormal maintenance and does not present additional fire potential in the operation of the aircraft.

A further object of this invention is to provide a starting system for turbine engines which broadens the environmental start envelope of the engine.

Other objects, advantages and novel features of the invention will become apparent from the following detailed description thereof when considered in conjunction with the accompanying drawing, the single FIGURE of which schematically illustrates a preferred embodiment thereof.

The present invention, in general, involves a damping means positioned in the inlet of a turbine engine to improve starting. The damper is spring loaded in the open or operating position and is closed during starting by hydraulic pressure from a hydraulic start accumulator or by some other actuating device. Closing the damper restricts the turbine inlet at start thereby reducing the air/fuel velocity across the engine ignitor and increasing the fuel/air mixture ratio. Depletion of the accumulator allows the spring to open the damper and permit normal acceleration to 100% rpm. A thermal override prevents closure of the damper during warm weather starting, when it is not needed.

The single FIGURE of the drawing illustrates schematically a turbine engine 11 having a combustor 12 and a main compressor 13. The damping means of the invention is mounted in inlet 14 of the engine and includes a damper 16, a damper actuator 17 which includes a piston 18 and an opposing spring 19, and a connecting rod 20. Actuator 17 in this instance is a hydraulic actuator which is pressurized to the operative condition by pressure from a hydraulic start accumulator 21 through a start valve 22 and a rate control orifice 23 in a communicating line 24. Damper 16 is prevented from being closed by a thermal override 27 which is actuated when the ambient temperature is not cold enough to require closure of the damper during starting. The engine start motor is schematically shown at 30.

In operation, damper 16, when in the closed position indicated in phantom at 31, restricts the open area of inlet 14 thereby reducing the air/fuel velocity across the engine ignitor, not shown, and increasing the fuel/air mixture ratio. Damper 16 is maintained in the open position by spring 19 in actuator 17, and is closed when the hydraulic pressure in line 24 overcomes the spring force and when thermal override 27 is in the inoperative or cold temperature condition. Hydraulic pressure is operative against piston 18 of actuator 17 continuously while start valve 22 is open. Thus, damper 16 is automatically closed during cold temperature engine start by pressure from the accumulator acting on piston 18 and is then allowed to gradually open as the accumulator pressure is depleted, thereby permitting the engine to increase to normal acceleration at 100% rpm. At high altitudes or under other very low temperature conditions, when a high pressure gradient, or air velocity, through the engine would otherwise preclude light-off of the fuel/air mixture, and where the pressure in accumulator 21 has been built up to normal starting pressure, the engine may be repeatedly started in the same manner and using the same components as were used for the initial start thereof. The start capability at high altitudes, i.e. very cold temperatures, is effected by reducing the velocities of the very cold air through inlet 14 and increasing the fuel/air mixture ratio within the engine.

It will be appreciated that the invention is applicable to any gas turbine engine to enhance its low temperature/high speed/high altitude start capability without impacting the normal starting ability of the unit or its normal operation. The invention adds only a small hydraulic actuator to the engine components and, therefore, does not add appreciably to the maintenance requirements associated with the particular engine. Once light-off has been achieved, the damper may be opened manually or automatically to permit acceleration to operating rpm.

What is claimed is:

1. In a gas turbine engine having a combustor including an ignitor thereof, a compressor with an air inlet and connected to said combustor for supplying a fuel/air mixture across the ignitor thereof, an improved main compressor intake system comprising:

rotatable damper means connected to said compressor at the air inlet thereof;

a hydraulic actuator having a piston linked to said rotatable damper means, said piston being resiliently biased to a normal operating position;

a hydraulic start accumulator disengagingly connected to said hydraulic actuator via a conduit, depletion of fluid pressure in said hydraulic start accumulator allowing said biasing means to return said rotatable damper means to the normal operating position after which said accumulator may be disengaged and pressure therein restored;

a hydraulically activated start motor and a start valve inserted in a fluid conduit connecting said hydraulic start accumulator and said motor;

a rate control orifice in said actuator conduit for controlling the rate of flow of liquid to said actuator and thereby the rate of travel of said piston; and thermal override means housed in said hydraulic actuator for preventing actuation of said rotatable damper means under selected temperature conditions;

whereby said hydraulic actuator conduit is operatively connected to said fluid conduit at a point intermediate said start valve and said hydraulically activated start motor; upon actuation of said start valve, fluid accumulated in said hydraulic start accumulator actuates said hydraulically activeted start motor via said fluid conduit and actuates said hydraulic actuator via said actuator conduit.

* * * * *